United States Patent Office 3,847,880
Patented Nov. 12, 1974

3,847,880
METHOD FOR VULCANIZING RUBBER WITH BIS-SULFENAMIDE ACCELERATORS
Chester D. Trivette, Jr., and John P. Vander Kooi, Akron, Ohio, assignors to Monsanto Company, St. Louis, Mo.
No Drawing. Filed Jan. 29, 1973, Ser. No. 327,469
Int. Cl. C08c 11/54; C08f 27/06
U.S. Cl. 260—79.5 B                  7 Claims

ABSTRACT OF THE DISCLOSURE

A process is described for accelerating the vulcanization of diene rubber which comprises heating rubber and vulcanizing agent with a compound of the formula

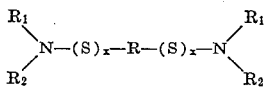

in which

is an amino radical and R is a divalent organic radical.

BACKGROUND OF THE INVENTION

The present invention relates to improvements in thioamine accelerators of vulcanization and more particularly, to a new class of delayed-action thioamine accelerators.

It is known that thioamines (sulfenamides) comprise compounds which have powerful accelerating activity as well as compounds which have little or no accelerating activity but are powerful inhibitors of premature vulcanization. A class of sulfenamides derived from secondary amines was disclosed by Zaucker et al. U.S. Pat. RE 19,286, Aug. 21, 1934 to accelerate the vulcanization of rubber of which certain thiazolesulfenamides have become important commercial accelerators. There was subsequently disclosed sulfenamides which ordinarily alone have no substantial accelerating power but nevertheless will retard the action of nitrogen-containing vulcanization accelerators at relatively low temperatures, Paul, U.S. Pat. 2,382,813, Aug. 14, 1945 and U.S. Pat. 2,460,393, Feb. 1, 1949.

Di(arylsulfenyl)amides which have no substantial accelerating ability per se were used as co-accelerators for primary vulcanization accelerators and reported to allow greater freedom of compounding variation, Coleman U.S. Pat. 2,423,007, June 24, 1947.

Coran, Trivette and Kerwood, U.S. Pat. 3,513,139, May 19, 1970 describe a class of sulfenamides which are outstanding inhibitors of premature vulcanization and may improve the modulus of a vulcanizate considerably. Coran and Kerwood U.S. Pat. 3,562,225, Feb. 9, 1971 report discovery of a class of bis(sulfenamides) which are excellent premature vulcanization inhibitors for vulcanizable diene rubber. The present invention concerns a class of bis(sulfenamides) which are primary accelerators, meaning that they accelerate the vulcanization of rubber in the absence of conventional accelerators. They are also useful in combination with other accelerators.

SUMMARY OF THE INVENTION

The accelerators of this invention are characterized by the formula

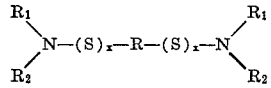

in which $R_1$ and $R_2$ independently are alkyl, aralkyl, cycloalkyl or $R_1$ and $R_2$ together with the nitrogen atom form a heterocycle, $x$ is one or two, R is alkylene, arylene, cycloalkylene or complex divalent radical formed by combination of two of the aforesaid radicals, for example, by combining an alkylene radical and a cycloalkylene radical a divalent radical is obtained in which one of the valences of R is linked to acyclic carbon and the other valence of R is linked to cyclic carbon.

Alkyl radicals of 1–8 carbon atoms are suitable with radicals of 1–4 carbon atoms being preferred. Examples of suitable alkyl radicals are methyl, ethyl, propyl, isopropyl, butyl, isobutyl, sec-butyl, tert-butyl, amyl, isoamyl, hexyl, heptyl and octyl. Aralkyl radicals of 7–10 carbon atoms are suitable with benzyl being preferred. Examples of suitable aralkyl radicals are benzyl, alpha-methyl benzyl, alpha, alpha-dimethyl benzyl, phenethyl, phenylpropyl and phenylbutyl. Suitable cycloalkyl radicals are cyclopentyl, cyclohexyl, 4-methylcyclohexyl, 2-methylcyclohexyl, and cyclooctyl.

Heterocyclic amino radicals of 4–8 carbon atoms are suitable with monocyclic six-membered rings being preferred. Examples of satisfactory heterocyclic amino radicals are pyrrolidinyl, 2,5-dimethyl pyrrolidinyl, piperidino, 4-methylpiperidino, 2-methylpiperidino, 2,6-dimethylpiperidino, 2,4,6-trimethylpiperidino, morpholino, thiomorpholino, 2,6-dimethylmorpholino, hexahydro-1H-azepin-1-yl, hexahydro - 1(2H)-azocin-1-yl, azabicyclo(3.2.2)non-3-yl, and octahydro-1H-azonin-1-yl.

The organic bridging group represented by R may contain up to 24 carbon atoms and may be interrupted by oxygen or sulfur. However, hydrocarbon bridging groups of 1–10 carbon atoms are preferred. Suitable R radicals are alkylene which may be branched or unbranced or interrupted by phenylene, oxygen or sulfur, arylene, cycloalkylene or divalent organic radicals formed by combinations thereof. A complex radical may be represented by —T—T'— wherein T and T' are different radicals selected from the group consisting of alkylene, arylene or cycloalkylene. Examples of satisfactory R radicals are methylene, dimethylene, 1-methyl-dimethylene, 1-phenyl dimethylene, tri-methylene, tetramethylene, 1,4-dimethyl-tetramethylene, penta methylene, hexamethylene, xylene, oxy bis(methylene), oxy-bis(dimethylene), oxy bis-2,2′(1-methyldimethylene), thio bi(dimethylene), 1,8-octylene, 1,12 - dodecylene, 1,10-octadecylene, 1,18-octadecylene, phenylene 1,4-cyclohexylene, 1,2-cyclohexylene, 2,5-bicyclo(2.2.1)-heptylene, 2,9-para-menthanylene, and cyclo-octylene. Bis-sulfenamides having para-xylene bridging groups are particularly potent accelerators.

The accelerators of this invention are used in the same manner as conventional accelerators. They are incorporated into the rubber by addition to an internal mixer, such as a Banbury mixer or they may be added to the rubber on a mill. The fully compounded stocks are then heated to effect vulcanization. The amount of accelerator used varies depending upon the properties desired in the vulcanizates but generally is between 0.2–6.0 parts by weight per 100 parts by weight of rubber with 0.5–2.0 parts by weight per 100 parts by weight of rubber being the amount normally used.

The rubber stocks include conventional compounding ingredients such as carbon blacks, zinc oxide, reinforcing silica, stearic acid, extender oils, phenolic antidegradants, phenylenediamine antidegradants, tackifiers, scorch inhibitors and bonding agents and may also include conventional accelerators. Elemental sulfur is the most common vulcanizing agent but any sulfur containing vulcanizing agent which at cure temperature or below releases sulfur in the form available to cross-link rubber is suitable. Illustrative sulfur-vulcanizing agents are amino disulfides, for example, dimorpholinodisulfide, and polymeric polysulfides, for example, alkyl phenol disulfide.

The accelerators of this invention can be used in any sulfur-vulcanizable diene rubber. Natural and synthetic rubbers and mixtures thereof are suitable. Synthetic rubbers include cis-4-polybutadiene, butyl rubber, ethylene-propylene terpolymers; polymers of 1,3-butadiene, polymers of isoprene, copolymers of 1,3-butadiene with other monomers, for example, styrene, acrylonitrile, isobutylene, and methylmethacrylate.

For the rubber stocks tested and described herein as illustrative of the invention, Mooney scorch times at 121° and 135° C. are determined by means of a Mooney plastometer. The time in minutes ($t_5$) required for the Mooney reading to rise five points above the minimum viscosity is recorded. Longer times on the Mooney scorch test are desirable because this indicates greater processing safety. Cure characteristics are determined at the designated temperatures by means of the Monsanto Oscillating Disk Rheometer which is described by Decker, Wise and Guerry in *Rubber World,* December 1962, page 68. From the rheometer data, the maximum torque, R max., in rheometer units is recorded. The increase in torque is a measure of the degree of vulcanization and is proportional to the cross-link density. The time, $t_2$, in minutes for a rise of two rheometer units above the minimum reading, and the time, $t_{90}$, required to obtain a torque of 90% of the maximum is recorded. The difference, $t_{90}-t_2$, is a measure of the cure rate of the sample. Vulcanizates are prepared by press curing at the selected temperature for the time indicated by the rheometer data to obtain optimum cure. The physical properties of the vulcanizates are measured by conventional methods.

DESCRIPTION OF PREFERRED EMBODIMENTS

The bis-sulfenamides of the invention may be prepared by substituting the appropriate reactants in the known condensation of an amine with a sulfenyl halide. More particularly, two molecular proportions of the amine are condensed with one molecular proportion of a disulfenyl chloride in the presence of a hydrogen chloride accepter. The same amine as employed in the condensation may be used as hydrogen chloride accepter by charging an excess of the amine sufficient to form the amine hydrochloride salt from by-product hydrogen chloride. The condensations are conveniently carried out in a water immiscible organic solvent inert to the reactants from which the desired sulfenamide is recovered. Solid products of limited solubility in the reaction medium are conveniently recovered by filtration and liquid products, which are usually more soluble, are recovered by evaporation of the solvent and, if desired, purified by distillation in vacuo. Removal of by-product amine hydrochloride is usually effected after completing the condensation by washing the sulfenamide product, or the organic solvent reaction mixture containing it, with water.

Similarly, bis-thiosulfenamides, accelerators wherein $x$ is two, are prepared by using a bis(thiosulfenyl)chloride as the disulfenyl chloride in the above described condensation. For example, 0.1 mole of bis(chlorodisulfenyl) methane, *Synthesis* November 1971, page 565, is condensed with 0.2 mole of morpholine and 0.2 mole triethylamine in 200 ml. of benzene at 0–10° C. The reaction mixture is washed with three 100 ml. portions of water to remove by-product amine salt, and then dried over sodium sulfate. The benzene is removed by vacuum distillation to give essentially pure 1,1-bis(morpholinodithio) methane.

Both bis(thiosulfenyl)chlorides and disulfenyl chlorides required as intermediates are known. A typical procedure for preparing a disulfenyl chloride intermediate by chlorinating the appropriate dithiol is as follows: 1,2-ethanedithiol (94 g., 1.0 mole) and 1000 ml. of benzene is placed in a 2 liter flask equipped with a condenser, stirrer and gas inlet tube. To the stirred solution maintained at 25° C. by a water bath, there is added 1.0 mole of chlorine at the rate of about one gram per minute. At first a colorless solid precipitates but as the chlorine addition continues, the precipitate dissolves and a clear orange solution is obtained when all the chlorine is added. Then, 100 ml. of benzene is removed on a rotary evaporator. The resulting benzene solution of 1,2-ethanedisulfenyl chloride is ready for use as reactant without further purification. Other sulfenyl chloride solutions are prepared by analogous procedures. Sometimes, it is desirable to conduct the chlorine addition at lower temperatures often 0° C. is satisfactory. Also, solvents other than benzene may be used and sometimes are preferred.

A typical preparation of a bis sulfenamide ($x$ is 1) is illustrated below by the reaction of α,α'-*p*-xylene disulfenyl chloride and morpholine.

α,α'-Bis(morpholinothio)-*p*-xylene

To a solution of α,α'-*p*-xylenedithiol (0.1 mole) in 200 ml. of benzene there is slowly added at 25° C. 14 grams of chlorine. One hundred ml. of benzene are removed from the reaction mixture by evaporation under reduced pressure in a rotary evaporator. The resulting solution of α,α'-*p*-xylene disulfenyl chloride in 100 ml. of benzene is then added with stirring at 10° C. to a solution of morpholine (0.40 mole) in 100 ml. of benzene. The reaction mixture is stirred overnight at room temperature. Benzene (500 ml.) and water (500 ml.) are added and the mixture is filtered to recover 18 grams of product. The benzene layer is separated, washed twice with water, dried over sodium sulfate, and vacuum stripped to yield 5 additional grams of product for an overall yield of 79 percent. Recrystallized from toluene, α,α'-bis(morpholinothio)-*p*-xylene melts at 165–166.5° C.

The following bis-sulfenamides are prepared by similar procedures.

| Compound: | M.P. ° C. |
|---|---|
| 1,2-bis(morpholinothio)ethane | 108.7–109.5. |
| 1,2-bis(dibenzylaminothio)ethane | 136.0–136.5. |
| 1,6-bis(morpholinothio)hexane | 63–66. |
| 1,2 - bis(2,6 - dimethylmorpholinothio) ethane (predominately cis isomer) | 75.6–79.0. |
| 1,2-bis(piperidinothio)ethane | 59–60. |
| α,α'-bis(piperidinothio)*p*-xylene | 111.0–112.5 |
| 2,2'-bis(morpholinothio)oxydiethane | liquid. |
| 1,6 - bis(2,6 - dimethylmorpholinothio) hexane | yellow oil. |
| α,α' - bis(2,6 - dimethylmorpholino)*p*-xylene | yellow oil. |
| 1,2 - di(2,6 - dimethylmorpholinothio) propane | liquid. |
| 1 - (morpholinothioethyl)-3 or 4(morpholinothio)cyclohexane | liquid. |
| 1-(piperidinothioethyl)-3 or 4(piperidinothio)cyclohexane | liquid. |
| 1,2-bis(dimethylaminothio)ethane | yellow oil. |
| 1,2-bis(diethylaminothio)ethane | brownish. |
| 2,9-di(piperidinothio)*p*-menthane | liquid. |
| 2,9-di(morpholinothio)*p*-menthane | liquid. |

The following tables illustrate the use of the bis-sulfenamides as accelerators in the vulcanization of rubber. Natural rubber and synthetic rubber masterbatches are prepared by mixing the ingredients shown below in standard rubber mixing equipment. All parts are by weight. Santoflex 13, an anti-degradant, is N - (1,3 - dimethylbutyl)-N' - phenyl - *p* - phenylenediamine, Santocure NS, an accelerator, is N - *tert* - butyl - 2 - benzothiazolesulfenamide and Santocure MOR, an accelerator, is 2 - (morpholinothio)benzothiazole. To portions of the masterbatch, sulfur vulcanizing agent and accelerator are added to prepare vulcanizable compositions which are tested as previously explained.

| Ingredient | Masterbatches | |
|---|---|---|
| | Natural rubber | SBR |
| Natural rubber | 100.0 | |
| Oil-extended SBR 1712 | | *137.5 |
| Zinc oxide | 3.0 | 3.0 |
| Stearic acid | 2.0 | 1.0 |
| ISAF carbon black | 45.0 | 65.0 |
| Hydrocarbon softener | 5.0 | 1.5 |
| Santoflex 13 | 2.0 | 2.0 |
| Total | 157.0 | 210.0 |

*100 parts styrene-butadiene rubber, 37.5 parts aromatic oil.

TABLE I

| | |
|---|---|
| NR masterbatch | 157.0 |
| Sulfur | 2.0 |
| $\alpha,\alpha'$-Bis(morpholinothio)$p$-xylene | 1.0 |
| Mooney scorch at 250° F.; $t_5$, minutes | 66.0 |
| Rheometer data at 292° F.: | |
| $t_{90}$, minutes | 56.0 |
| $t_2$, minutes | 15.0 |
| $t_{90}-t_2$ | 40.5 |
| R. max | 41.0 |
| Stress-strain data at 292° F.: | |
| Cure time, minutes | 80.0 |
| 300% modulus, p.s.i | 1,600.0 |
| Ult. tensile, p.s.i | 3,770.0 |

The data show that the $\alpha,\alpha'$-bis(morpholinothio)$p$-xylene is a potent accelerator as shown by the rheometer torque and modulus values.

TABLE II

| | 1 | 2 |
|---|---|---|
| NR masterbatch | 157.0 | 157.0 |
| Sulfur | 1.0 | 1.0 |
| Santocure NS | 0.5 | 0.5 |
| $\alpha,\alpha'$-Bis(morpholinothio)-$p$-xylene | 1.0 | 2.0 |
| Mooney scorch at 250° F.: $t_5$, minutes | 55.8 | 64.6 |
| Rheometer data at 292° F.: | | |
| $t_{90}-t_2$ | 7.8 | 7.8 |
| R. max | 51.9 | 54.6 |
| Stress-strain data at 292° F.: | | |
| Cure time, minutes | 30 | 35 |
| 300% modulus, p.s.i | 1,410 | 1,550 |
| Ult. tensile, p.s.i | 3,240 | 3,390 |

Table II shows the use of $\alpha,\alpha'$-bis(morpholinothio)-$p$-xylene with a commercial benzothiazole sulfenamide accelerator. The data show that the bis-sulfenamide is effective as a co-accelerator.

TABLE III

| | 1 | 2 | 3 |
|---|---|---|---|
| NR masterbatch | 157.0 | 157.0 | 157.0 |
| Sulfur | 2.0 | 2.0 | 1.0 |
| Santocure NS | 0.5 | 0.5 | |
| 2,2'-Bis(morpholinothio)oxydiethane | | 1.0 | |
| 1,2-bis(piperidinothio)-ethane | | | 1.5 |
| Mooney scorch at 250° F.: $t_5$, minutes | 29.2 | 33.4 | 29.4 |
| Rheometer data at 292° Ft: | | | |
| $t_{90}-t_2$ | 11.2 | 7.4 | 18.0 |
| R. max | 50.8 | 63.3 | 46.7 |
| Stress-strain data at 292° F.: | | | |
| Cure time, minutes | 30 | 25 | 60 |
| 300% modulus, p.s.i | 1,410 | 2,050 | 1,100 |
| Ult. tensile, p.s.i | 3,260 | 3,650 | 3,430 |

The activity of other bis-sulfenamides of the invention is demonstrated in Table III. Stock 2 illustrates the use of 2,2'-bis(morpholinothio)oxydiethane as a co-accelerator and Stock 3 illustrates the activity of 1,2-bis(piperidinothio)ethane in a semi-efficient cure system using a high accelerator to sulfur ratio.

The activity of dialkylamino bis-sulfenamides as co-accelerators with two known accelerators is illustrated in natural rubber stocks in Table IV and in synthetic rubber stocks in Table V.

TABLE IV

| | 1 | 2 | 3 | 4 | 5 | 6 |
|---|---|---|---|---|---|---|
| NR masterbatch | 157.0 | 157.0 | 157.0 | 157.0 | 157.0 | 157.0 |
| Sulfur | 2.0 | 2.0 | 2.0 | 2.0 | 2.0 | 2.0 |
| Santocure NS | 0.5 | 0.5 | 0.5 | | | |
| Santocure MOR | | | | 0.5 | 0.5 | 0.5 |
| 1,2-bis(dimethylaminothio)ethane | | 0.6 | | | 0.6 | |
| 1,2-bis(diethylaminothio)ethane | | | 0.6 | | | 0.6 |
| Mooney scorch at 250° F.: $t_5$ minutes | 39.8 | 24.4 | 26.0 | 43.9 | 22.3 | 23.3 |
| Rheometer data at 292° F.: | | | | | | |
| $t_{90}-t_2$ | 12.2 | 8.2 | 9.7 | 15.7 | 10.7 | 11.5 |
| R. max | 55 | 69 | 70 | 55 | 70 | 72 |
| Stress-strain data at 292° F.: | | | | | | |
| Cure time, minutes | 35 | 30 | 30 | 35 | 30 | 30 |
| 300% modulus, p.s.i | 1,220 | 1,810 | 1,730 | 1,260 | 1,700 | 1,650 |
| Ult. tensile, p.s.i | 3,700 | 4,000 | 4,100 | 3,650 | 4,080 | 4,100 |

TABLE V

| | 1 | 2 | 3 | 4 | 5 | 6 |
|---|---|---|---|---|---|---|
| SBR masterbatch | 210.0 | 210.0 | 210.0 | 210.0 | 210.0 | 210.0 |
| Sulfur | 2.0 | 2.0 | 2.0 | 2.0 | 2.0 | 2.0 |
| Santocure NS | 1.0 | 1.0 | 1.0 | | | |
| Santocure MOR | | | | 1.0 | 1.0 | 1.0 |
| 1,2-bis(dimethylaminothio)ethane | | 0.9 | | | 0.9 | |
| 1,2-bis(diethylaminothio)ethane | | | 0.9 | | | 0.9 |
| Mooney scorch at 275° F.: $t_5$, minutes | 19.4 | 9.2 | 6.3 | 24.2 | 7.2 | 7.0 |
| Rheometer data at 307° F.: | | | | | | |
| $t_{90}-t_2$ | 16.6 | 11.7 | 11.3 | 18.9 | 15.0 | 12.0 |
| R. max | 71 | 82 | 81 | 69 | 82 | 79 |
| Stress-strain data at 307° F.: | | | | | | |
| Cure time, minutes | 45 | 45 | 45 | 50 | 45 | 45 |
| 300% modulus, p.s.i | 1,320 | 1,750 | 1,760 | 1,200 | 1,850 | 1,760 |
| Ult. tensile, p.s.i | 3,020 | 2,940 | 2,900 | 3,100 | 2,720 | 2,650 |

The following masterbatches comprising polybutadiene blends are used to further illustrate the accelerator activity of the bis-sulfenamides of the invention.

| Ingredients | Masterbatches | |
|---|---|---|
| | Natural rubber blend | SBR blend |
| Natural rubber | 75.0 | |
| Cis-4-polybutadiene | 25.0 | |
| Oil-extended SBR 1712 | | 89.38 |
| Oil-extended polybutadiene | | *48.12 |
| ISAF carbon black | 42.0 | |
| N-285 carbon black | | 70.0 |
| Hydrocarbon softener | 7.0 | 5.0 |
| Zinc oxide | 3.0 | 3.0 |
| Stearic acid | 3.0 | 1.0 |
| Santoflex 13 | 2.0 | 2.0 |
| Total | 157.0 | 218.50 |

*35 parts polybutadiene rubber. 13.12 parts aromatic oil.

Tables VI and VII illustrate the activity of the bis-sulfenamides of this invention. Stocks 1 and 4 are control stocks containing only conventional accelerators. Stocks 2, 3, 5, and 6 contain bis-sulfenamides of this invention as co-accelerators. The data show that stocks containing bis-sulfenamides of this invention exhibit enhanced crosslinking efficiency as demonstrated by the higher rheometer and modulus values and improved processing safety.

TABLE VI

| | 1 | 2 | 3 | 4 | 5 | 6 |
|---|---|---|---|---|---|---|
| NR blend masterbatch | 157.0 | 157.0 | 157.0 | 157.0 | 157.0 | 157.0 |
| Sulfur | 2.0 | 2.0 | 2.0 | 2.0 | 2.0 | 2.0 |
| Santocure NS | 0.75 | 0.75 | 0.75 | | | |
| Santocure MOR | | | | 0.75 | 0.75 | 0.75 |
| $\alpha,\alpha'$-Bis(morpholinothio)$p$-xylene | | 0.6 | | | 0.6 | |
| 1-(morpholinothioethyl)3- or 4-(morpholinothio)cyclohexane | | | 0.6 | | | 0.6 |
| Mooney scorch at 250° F.: $t_5$, minutes | 32.6 | 53.7 | 51.4 | 43.0 | 66.3 | 65.9 |
| Rheometer data at 310° F.: | | | | | | |
| $t_{90}-t_2$ | 7.7 | 7.8 | 8.0 | 9.5 | 9.1 | 8.4 |
| R. max | 71.4 | 82.4 | 80.3 | 72.2 | 82.4 | 80.5 |
| Stress-strain data at 310° F.: | | | | | | |
| Cure time, minutes | 13 | 15 | 15 | 16 | 16 | 16 |
| 300% modulus, p.s.i | 1,270 | 1,500 | 1,380 | 1,190 | 1,500 | 1,410 |
| Ult. tensile, p.s.i | 3,650 | 3,600 | 3,280 | 3,920 | 3,580 | 3,470 |

TABLE VII

|  | 1 | 2 | 3 | 4 | 5 | 6 |
|---|---|---|---|---|---|---|
| SBR blend masterbatch | 218.5 | 218.5 | 218.5 | 218.5 | 218.5 | 218.5 |
| Sulfur | 1.8 | 1.8 | 1.8 | 1.8 | 1.8 | 1.8 |
| Santocure NS | 1.2 | 1.2 | 1.2 |  |  |  |
| Santocure MOR |  |  |  | 1.2 | 1.2 | 1.2 |
| $\alpha,\alpha'$-Bis(morpholinothio)p-xylene | 0.6 |  |  | 0.6 |  |  |
| 1-(morpholinothioethyl)3- or 4-(morpholinothio) cyclohexane |  |  | 0.6 |  |  | 0.6 |
| Mooney scorch at 275° F.: $t_5$, minutes | 18.3 | 24.8 | 24.0 | 21.9 | 29.5 | 29.3 |
| Rheometer data at 320° F.: |  |  |  |  |  |  |
| $t_{90}-t_2$ | 7.4 | 7.0 | 7.4 | 9.3 | 7.9 | 8.3 |
| R. max | 61.1 | 66.7 | 65.5 | 58.2 | 68.0 | 66.4 |
| Stress-strain data at 320° F.: |  |  |  |  |  |  |
| Cure time, minutes | 15 | 15 | 15 | 17 | 17 | 17 |
| 300% modulus, p.s.i | 1,350 | 1,450 | 1,300 | 1,230 | 1,560 | 1,450 |
| Ult. tensile, p.s.i | 2,980 | 2,750 | 2,540 | 2,720 | 2,850 | 2,920 |

Evaluations of other bis-sulfenamides of the invention as accelerators, for example, 1,2-bis(morpholinothio)ethane,
1,2-bis(dibenzylaminothio)ethane,
1,6-bis(morpholinothio)hexane,
1,2-bis(2,6-dimethylmorpholinothio)ethane,
1,6-bis(2,6-dimethylmorpholinothio)hexane,
$\alpha,\alpha'$-bis(2,6-dimethylmorpholinothio)-p-xylene,
$\alpha,\alpha'$-bis(piperidinothio)-p-xylene and
1,2-di(2,6-dimethylmorpholinothio)propane and the correspnding bis(thiosulfenamides) give results similar to those illustrated above.

In addition to the valuable accelerator properties of the bis-sulfenamides of this invention, the bis-sulfenamides are excellent chain-extenders and cross-linking agents for mercapto-terminated polymers. For example, one part of 1,2-bis(morpholinothio)ethane is slurried with 9 parts of mercapto-terminated butadiene-acrylonitrile liquid polymer (Mycar MTBN) at room temperature. The slurry becomes a clear liquid upon heating; after ½ hour at 100° C. the liquid is cooled to give a clear yellow elastomer which exhibits low swelling in benzene.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. The process of accelerating the vulcanization of sulfur-vulcanizable diene rubber which comprises heating said rubber and sulfur vulcanizing agent with an accelerating amount of a compound of the formula

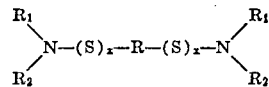

in which $R_1$ and $R_2$ independently are alkyl of 1–8 carbon atoms, aralkyl of 7–10 carbon atoms, cycloalkyl of 5–8 carbon atoms or $R_1$ and $R_2$ together with the nitrogen atom form a heterocycle of 4–8 carbon atoms, $x$ is one or two, R contains 1–24 carbon atoms and is alkylene, arylene, cycloalkylene, or T–T' where T and T' are different radicals selected from the group consisting of alkylene, arylene, and cycloalkylene.

2. The method of Claim 1 in which R contains 1–10 carbon atoms and $x$ is one.

3. The method of Claim 2 in which R is alkylene and $R_1$ and $R_2$ are alkyl.

4. The method of Claim 3 in which R is ethylene and $R_1$ and $R_2$ are methyl.

5. The method of Claim 2 in which R is alkylene and

is a heterocycle.

6. The method of Claim 5 in which R is para-xylene.

7. The method of Claim 6 in which

is morpholino.

References Cited
UNITED STATES PATENTS

| Re. 19,286 | 8/1934 | Zaucker et al. | 260—786 |
| 2,382,813 | 8/1945 | Paul | 260—795 |
| 3,407,207 | 10/1968 | Longi et al. | 260—795 |
| 2,423,007 | 6/1947 | Coleman | 260—795 |
| 3,513,139 | 5/1970 | Coran et al. | 260—79.5 B |
| 3,562,225 | 2/1971 | Coran et al. | 260—79.5 B |
| 3,579,516 | 5/1971 | Albert | 260—784 |
| 3,631,071 | 12/1971 | Raasch | 260—783 |
| 3,689,467 | 9/1972 | Boustany et al. | 260—79.5 B |
| 3,773,717 | 11/1973 | Shoffner | 260—79.5 B |

DONALD E. CZAJA, Primary Examiner

R. W. GRIFFIN, Assistant Examiner

U.S. Cl. X.R.

260—5, 41.5 MP, 784, 793, 795, 798